Inventor:
Ernst Legler
by Michael S. Striker
Attorney

United States Patent Office 3,102,924
Patented Sept. 3, 1963

3,102,924

ARRANGEMENT FOR LIGHT DEPENDENT STABILIZATION OF A VIDICON TUBE

Ernst Legler, Darmstadt, Germany, assignor to Fernseh G.m.b.H., Darmstadt, Germany Filed Nov. 16, 1960, Ser. No. 69,607
Claims priority, application Germany Nov. 25, 1959
6 Claims. (Cl. 178—7.2)

The present invention relates to an arrangement for stabilizing the output of a vidicon pickup tube, that is, for maintaining approximately constant the amplitude of the video output signal derived from such a pickup tube when the illumination of its photosensitive layer fluctuates.

Both during direct transmission by means of a vidicon camera and also in the transmission of film by means of a telecine scanner using a vidicon pickup tube it is impossible to avoid the intensity of the light falling upon the photosensitive layer of the pickup tube fluctuating within wide limits. In the operation of equipment of this kind there therefore arises the necessity of keeping the amplitude of the video output signal at least approximately constant despite these variations in illumination of the photosensitive layer. This operation requires continuous, careful observation of the signal level and appropriate readjustment of the parameters affecting the signal level.

In pickup tubes of the vidicon type it is possible, by varying the bias applied to the signal plate, to vary within certain limits the sensitivity of the pickup tube, that is, the ratio of the signal current delivered by the tube to the illumination of its photosensitive layer.

To keep the level of the output signal constant by hand necessitates highly skilled operators, and requires from these assiduous attention and extreme care. Despite this, errors in operation of too great a delay in the operation of the controls cannot always be avoided, and these may have a very disadvantageous effect upon the quality of the television picture.

It would therefore be a very great advance if the operation of keeping the amplitude of the derived video signal approximately constant when the illumination changes could be carried out automatically, and numerous proposals have been made for effecting such an automatic control.

As the forerunner of such fully-automatic control systems there may be regarded the methods, often used even in photographic cameras, of making use of a photoelectric device to measure the illumination and providing an indication of its magnitude. In television cameras the photocurrent of the pickup tube may be used directly for this purpose. It has also been previously proposed to adjust the aperture of the objective automatically in accordance with the controlling magnitude thus obtained. Such arrangements are, however, very expensive to adopt because of the considerable amplification of the photocurrent which is necessary to effect the operation of the diaphragm and they often do not operate sufficiently quickly and accurately.

The similar possibility, of deriving a control magnitude from the television signal, after appropriate amplification if necessary, also encounters grave difficulties owing to the character of the picture signal and because its form is dependent upon the picture content. If, as has often been proposed, the control magnitude is derived from the mean value of the television signal, thus keeping constant the average illumination of the photosensitive member of the pickup tube, then despite this the instantaneous value of the television signal corresponding to the brightest parts of the picture will assume very different value according to the picture content and may in certain circumstances substantially exceed the allowable range of amplitude. It is true that there is still the possibility of using an amplitude limiter to prevent the allowable signal level being exceeded, but this arrangement is necessarily associated with a loss of picture content or, at the least, with a considerable gradation distortion in the bright parts of the picture.

It has also been proposed to derive the control signal by peak rectification of the television signal. It is true that by this means any excess of the instantaneous value of the television signal corresponding to the brightest picture points above the allowable output level is avoided, but despite this, however, this kind of control cannot give satisfaction, since every small, bright part of the picture, such as a highlight, brings the control into operation so that on the average the amplitude of the television signal is too greatly reduced.

Finally, it has also been proposed, in apparatus using a pickup tube of the vidicon type, to derive whenever the television signal delivered by the pickup tube exceeds a given limiting amplitude, a control signal corresponding to the excess of the video signal above that value, this control signal being likewise obtained by peak rectification of the television signal. By means of the control signal obtained in this manner, after further appropriate operations, the intensity of the illumination of the photosensitive member for the brightest picture point at any time can be kept practically constant by alteration of the object illumination or, in known manner, by altering the bias applied to the target of the vidicon. To carry out the proposed method it would be necessary to provide a clipping stage adjusted to the chosen limiting level and to obtain the mean value of the signal components exceeding this level from a rectifier fed with the signal passed by this stage. To control the bias for the target of the vidicon, still further amplification of the control voltage thus obtained would be necessary in order to obtain sufficient loop gain.

It is an object of the present invention to provide an arrangement for stabilizing the output of a vidicon pickup tube, in which the video output signal delivered by said pickup tube is applied to the base-emitter path of a transistor so biased that the collector current which it passes corresponds to the mean value of those components of said video signal which exceed a predetermined amplitude and connected in one limb of a voltage divider from which is derived the bias applied to the target of said pickup tube, so that as said current increases the voltage on said target is reduced.

A further object is to avoid the unwanted effect of variations of the temperature on the above arrangement caused by the temperature dependence of the transistor.

A control circuit arrangement according to the invention solves the present problem in a complete and exceedingly simple manner. By the application of the video signal to the appropriately-biased base-emitter path of the transistor the signal components exceeding the chosen maximum level produce a base current in the transistor, which gives rise to a substantially amplified collector current, the mean value of which serves as the control signal. It is thus attained on the one hand that small bright portions of the picture, of the signal peaks corresponding to these, do not give rise to any sudden alteration of the magnitude of the control signal. On the other hand, owing to the high control gain of the circuit due to the current gaing of the transistor it is ensured that the maximum value of the output signal remains sufficiently constant during alterations of illumination. The control signal appearing in the emitter-collector circuit of the transistor then comprises a current of sufficient magnitude for it to effect the control directly, without any additional amplification, if the emitter-collector path of the transistor is connected in the lower limb of a voltage divider from which the target bias is drawn.

If the transistor used in a control circuit according to the invention should be subjected to large alterations of temperature, such as may occur when it is included in a television camera without temperature stabilization, the alteration of the control characteristics through the change in temperature of the transistor can be compensated in a simple manner. One way of doing this is, for example, to arrange that the reference potential of the clamp circuit for the television signal applied to the emitter-base path of the transistor is correspondingly altered. This may be effected by taking the reference voltage from a voltage divider which contains a temperature-dependent resistance. An alternative method of temperature compensation is to provide a further transistor of the opposite conductivity type, to the base of which the controlling video signal is applied and from the collector of which the original transistor is fed.

In order that the control arrangement according to the invention may be further explained and fully understood, it will now be described with reference to the accompanying drawings, comprising FIGURES 1 to 3, of which:

Figure 1:
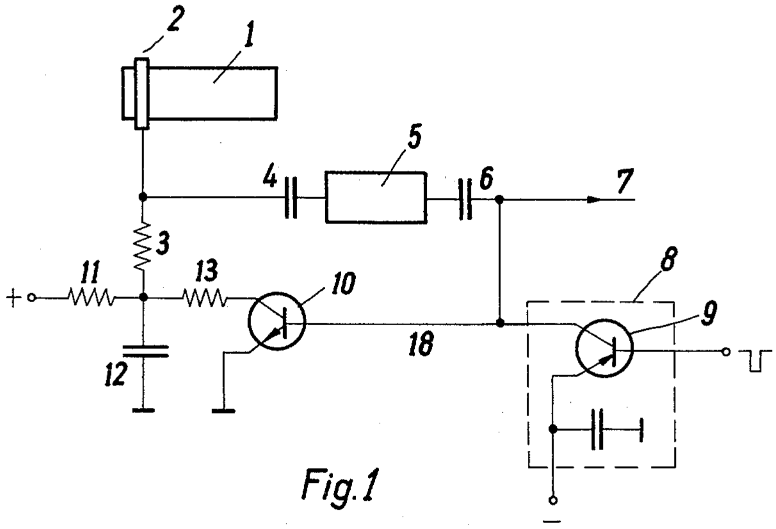
FIGURE 1 shows a circuit diagram of one embodiment of the arrangement according to the invention for stabilizing the output of a vidicon pickup tube.

In FIGURE 1, 1 is a pickup tube of the vidicon type. The signal current derived from the target 2 of pickup tube 1 in traversing the load resistance 3 gives rise to a work signal which is transmitted by way of a capacitor 4 to an amplifier 5. This amplifier may in practice be divided into a head amplifier and a main amplifier. The gain of amplifier 5 is conveniently so large that at its output there appears a television signal having the standard value of 1 $V_{pp}$. This television signal is transmitted by way of a capacitor 6 to an output lead 7 by which it is taken for use in any normal manner and is stabilized as regards a reference level by means of a clamp circuit 8. The reference level to which the signal is stabilized may be the black level or the blanking level of the signal. In the present embodiment the clamp circuit consists of a pnp transistor 9 to the base of which negative-going clamp pulses are applied from a conventional pulse generator (not shown). Any other known type of clamp circuit may, however, be employed.

The television signal thus amplified and containing a stabilized reference level is passed by way of a lead 18 to the base of an npn transistor 10, the emitter of which is connected to earth. The reference voltage for the clamp circuit 8 is adjusted to a value negative with respect to earth such that only those signal components of the television signal exceeding a chosen maximum level, which may for example be 2 $V_{pp}$, give rise to a flow of current from the base to the emitter of transistor 10.

The emitter-collector path of the transistor 10, in series with a resistor 13, forms one limb of a voltage divider of which the second limb is formed by a further resistor 11, which is connected to the positive terminal of a suitable voltage source, the negative terminal of which is earthed. The junction of resistors 11 and 13 is connected by way of the load resistor 3 to the target of the vidicon. As long as the signal applied to the transistor has an amplitude of less than 2 $V_{pp}$, that is, when the illumination is not excessive, no current flows either in the base-emitter circuit nor in the emitter-collector circuit and the target of the vidicon receives by way of the resistors 11 and 3 the full voltage of the source. If the illumination of the object increases, so that the increase in the light falling upon the photosensitive target of the vidicon gives rise to an increase in the amplitude of the television signal applied to the base of the transistor above the chosen value of 2 $V_{pp}$ then those components of the signal which are in excess of this level appear amplified in the emitter-collector current of transistor 10 and effect a reduction in the bias applied to the target. This in turn produces a reduction in the signal current developed by the vidicon, so that at least an approximate stabilization of the output results.

The control produced by this circuit is extraordinarily effective. For example, if the illumination of the target changes in the ratio 100:1 the output level remains constant to within 5%. The circuit above described also enables the extraordinary simplicity of the control circuit to be seen, since the one single transistor 10 effects both the operation of amplification and that of deriving the desired control signal.

Figure 2:
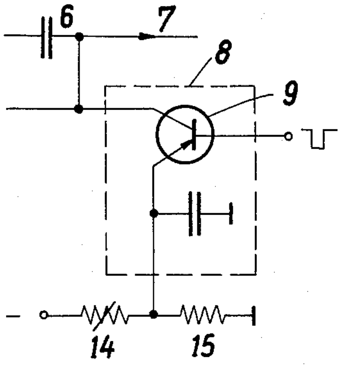
FIGURE 2 shows a partial circuit diagram illustrating a modification to the arrangement shown in FIGURE 1

The variation of the control characteristic with the temperature of the transistor 10, which becomes noticeable with large changes in temperature, can be very simply compensated by adopting the device shown in FIGURE 2. The modification to the circuit already described in relation to FIGURE 1 consists in taking the reference voltage for the clamp circuit 8 from a voltage divider consisting of resistors 14 and 15. Of these resistors, resistor 15 is independent of temperature, while resistor 14 is a temperature-dependent resistance with a negative temperature coefficient. As the temperature of the apparatus rises the emitter-collector current of transistor 10 has a tendency to increase and the signal plate voltage would therefore fall by an excessive amount. This effect is counteracted by that of the temperature sensitive resistor 14 in shifting the reference voltage of clamp circuit 8 to a more negative value.

Figure 3:
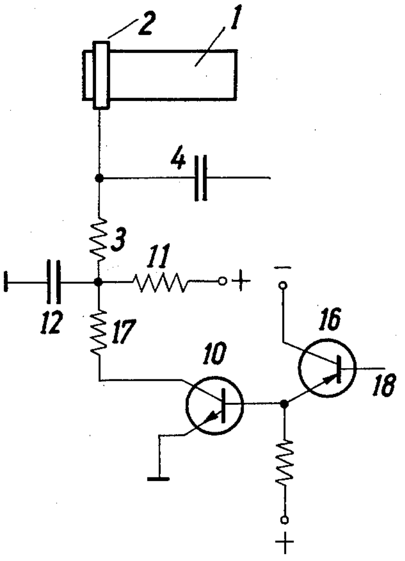
FIGURE 3 shows a partial circuit diagram illustrating a different modification to the arrangement shown in FIGURE 1.

An alternative method of obtaining the necessary compensation is shown in FIGURE 3. The circuit of FIGURE 1 is here modified by connecting a further transistor 16 of the opposite conductivity type, that is, a pnp transistor, between the video signal source and the base of transistor 10. The changes in current of the two transistors with varying temperature then cancel out, so that the output current of the control transistor 10 remains independent of temperature of the apparatus.

In order to avoid overloading of the transistor 10, an additional resistor 17 may be connected in its collector circuit as shown in FIGURE 3, limiting the collector current of the transistor 10.

What is claimed as new and desired to be secured by Letters Patent is:

1. In a television system, in combination, camera tube means of the vidicon type having a signal plate and delivering, when illuminated, a video signal; amplifier means for deriving from said video signal an amplified video signal; means for giving to said amplified video signal a predetermined stabilized reference level; voltage divider means having a center point connected with said signal plate, a first resistive branch connected between said center point and a source of constant positive direct current potential for applying to said signal plate a normal bias voltage, and a second resistive branch connected between said center point and ground, a transistor means being connected with its emitter-collector circuit in said second resistive branch for reducing said bias voltage available at said center point when a current flows through said emitter-collector circuit; means for producing at said center point a mean voltage value depending on the magnitude of said current flowing through said emitter-collector circuit; circuit means for applying said amplified video signal to the base of said transistor means; and means for biasing said base of said transistor means in such a manner that the latter is rendered conductive for an emitter-collector current only when components of said amplified video signal exceed a predetermined maximum, whereby the bias voltage applied to the signal plate is decreased automatically when the emitter-collector current increases due to excessive illumination of the tube, and the amplified video signal is maintained approximately constant.

2. In a television system, in combination, camera tube means of the vidicon type having a signal plate and delivering, when illuminated, a video signal; amplifier means for deriving from said video signal an amplified video signal; means for giving to said amplified video signal a predetermined stabilized reference level; voltage divider means having a center point connected with said signal plate, a first resistive branch connected between said center point and a source of constant positive direct current potential for applying to said signal plate a normal bias voltage, and a second resistive branch connected between said center point and ground, a transistor means being connected with its emitter-collector circuit in said second resistive branch for reducing said bias voltage available at said center point when a current flows through said emitter-collector circuit, compensating means being provided for compensating the effect of the temperature dependence of said transistor; means for producing at said center point a mean voltage value depending on the magnitude of said current flowing through said emitter-collector circuit; circuit means for applying said amplified video signal to the base of said transistor means; and means for biasing said base of said transistor means in such a manner that the latter is rendered conductive for an emitter-collector current only when components of said amplified video signal exceed a predetermined maximum, whereby the bias voltage applied to the signal plate is decreased automatically when the emitter-collector current increases due to excessive illumination of the tube, and the amplified video signal is maintained approximately constant.

3. In a television system, in combination, camera tube means of the vidicon type having a signal plate and delivering, when illuminated, a video signal; alternating current amplifier means for deriving from said video signal an amplified video signal; voltage divider means having a center point connected with said signal plate, a first resistive branch connected between said center point and a source of constant positive direct current potential for applying to said signal plate a normal bias voltage, and a second resistive branch connected between said center point and ground, a transistor means being connected with its emitter-collector circuit in said second resistive branch for reducing said bias voltage available at said center point when a current flows through said emitter-collector circuit; means for producing at said center point a mean voltage value depending on the magnitude of said current flowing through said emitter-collector circuit; circuit means for applying said amplified video signal to the base of said transistor means; and clamp circuit means for reinserting the direct current component into said amplified video signal and for biasing said base of said transistor means in such a manner that the latter is rendered conductive for an emitter-collector current only when components of said amplified video signal exceed a predetermined maximum, whereby the bias voltage applied to the signal plate is decreased automatically when the emitter-collector current increases due to excessive illumination of the tube, and the amplified video signal is maintained approximately constant.

4. In a television system, in combination, camera tube means of the vidicon type having a signal plate and delivering, when illuminated, a video signal; alternating current amplifier means for deriving from said video signal an amplified video signal; voltage divider means having a center point connected with said signal plate, a first resistive branch connected between said center point and a source of constant positive direct current potential for applying to said signal plate a normal bias voltage, and a second resistive branch connected between said center point and ground, a first transistor means of the n-p-n type being connected with its emitter-collector circuit in said second resistive branch for reducing said bias voltage available at said center point when a current flows through said emitter-collector circuit, a second transistor means of the p-n-p type having its collector connected with the base of said first transistor means, circuit means being provided for applying said amplified video signal to the base of said first transistor means and to the collector of said second transistor means; means for producing at said center point a mean voltage value depending on the magnitude of said current flowing through said emitter-collector circuit; means for applying negative-going clamp pulses to the base of said second transistor means; and means for applying to the emitter of said second transistor means a control potential which is negative in comparison with the potential of the emitter of said first transistor means, so that the latter is rendered conductive for an emitter-collector current only when components of said amplified video signal exceed a predetermined maximum, whereby the bias voltage applied to the signal plate is decreased automatically when the emitter-collector current increases due to excessive illumination of the tube, and the amplified video signal is maintained approximately constant.

5. In a television system, in combination, camera tube means of the vidicon type having a signal plate and delivering, when illuminated, a video signal; amplifier means for deriving from said video signal an amplified video signal; means for giving to said amplified video signal a predetermined stabilized reference level; voltage divider means having a center point connected with said signal plate, a first resistive branch connected between said center point and a source of constant positive direct current potential for applying to said signal plate a normal bias voltage, and a second resistive branch connected between said center point and ground, a main transistor means being connected with its emitter-collector circuit in said second resistive branch for reducing said bias voltage available at said center point when a current flows through said emitter-collector circuit, compensating means being provided for compensating the effect of the temperature dependence of said transistor, said compensating means comprising an auxiliary transistor means of a conductivity type opposite to that of said main transistor means, the collector of said auxiliary transistor means being connected with the base of said main transistor means; means for producing at said center point a mean voltage value depending on the magnitude of said current flowing through said emitter-collector circuit; circuit means for applying said amplified video signal to the base of said auxiliary transistor means; and means for biasing said base of said transistor means in such a manner that the latter is rendered conductive for an emitter-collector current only when components of said amplified video signal exceed a predetermined maximum, whereby the bias voltage applied to the signal plate is decreased automatically when the emitter-collector current increases due to excessive illumination of the tube, and the amplified video signal is maintained approximately constant.

6. In a television system, in combination, camera tube means of the vidicon type having a signal plate and delivering, when illuminated, a video signal; alternating current amplifier means for deriving from said video signal an amplified video signal; voltage divider means having a center point connected with said signal plate, a first resistive branch connected between said center point and a source of constant positive direct current potential for applying to said signal plate a normal bias voltage, and a second resistive branch connected between said center point and ground, a first transistor means of the n-p-n type being connected with its emitter-collector circuit in said second resistive branch for reducing said bias voltage available at said center point when a current flows through said emitter-collector circuit, a second transistor means of the p-n-p type having its collector connected with the base of said first transistor means, circuit means being provided for applying said amplified video signal to the base of said first transistor means and to the collector of said second transistor means; means for producing at said center point a mean voltage value depending on the magnitude of said current flowing through said emitter-collector circuit; means for applying negative-going clamp pulses to the base of said second transistor means; and means for applying to the emitter of said second transistor means a control potential which is negative in comparison with the potential of the emitter of said first transistor means, and including means for automatically varying said control potential in accordance with variations of the ambient temperature for compensating the effect of the temperature dependence of said first and second transistor means, so that the latter is rendered conductive for an emitter-collector current only when components of said amplified video signal exceed a predetermined maximum, whereby the bias voltage applied to the signal plate is decreased automatically when the emitter-collector current increases due to excessive illumination of the tube, and the amplified video signal is maintained approximately constant.

References Cited in the file of this patent

UNITED STATES PATENTS

| | | |
|---|---|---|
| 2,833,957 | Horowitz | May 6, 1958 |
| 2,911,562 | Fathaver | Nov. 3, 1959 |